United States Patent
Hayashi et al.

(12)
(10) Patent No.: US 6,309,794 B1
(45) Date of Patent: Oct. 30, 2001

(54) OPTICAL RECORDING MEDIA COMPRISING A RESIN FILM

(75) Inventors: Kozaburo Hayashi; Hiraku Kominami; Mieko Tanaka; Misao Konishi, all of Tochigi (JP)

(73) Assignee: Sony Chemicals Corporation, Tokyo (JP)

( * ) Notice: Subject to any disclaimer, the term of this patent is extended or adjusted under 35 U.S.C. 154(b) by 0 days.

(21) Appl. No.: 09/296,673

(22) Filed: Apr. 22, 1999

(51) Int. Cl.⁷ .................................................. G11B 7/24
(52) U.S. Cl. ................... 430/270.12; 430/270.11; 428/64.4
(58) Field of Search .................... 430/270.11, 270.12, 430/270.13; 428/64.3, 64.4, 64.6, 65.1, 65.2

(56) References Cited

U.S. PATENT DOCUMENTS 5,609,990 * 3/1997 Ha et al. ........................ 430/270.11

FOREIGN PATENT DOCUMENTS

A-63-206926  8/1988  (JP).
A-1-287847   11/1989 (JP).
A-2-101656   4/1990  (JP).

* cited by examiner

*Primary Examiner*—John A. McPherson
(74) *Attorney, Agent, or Firm*—Oliff & Berridge, PLC

(57) ABSTRACT

The present invention aims to provide a resin suitable for use as a protective layer or adhesive layer formed on the surface of a metal film. A liquid oligomer having a high specific gravity of 1.10 or more is contained in a photocurable resin involved in photopolymerization of a resin composition. Upon application on a metal film 12 and photopolymerization, bulky substituents owned by the high-specific gravity liquid oligomer prevent penetration of moisture to provide a protective film 13 with low water permeability. Said high-specific gravity liquid oligomer should desirably be contained in the photocurable resin within the range from 35% by weight to 78% by weight both inclusive.

5 Claims, 1 Drawing Sheet

OPTICAL RECORDING MEDIA COMPRISING A RESIN FILM

FIELD OF THE INVENTION

The present invention relates to resin films for use in optical disks or magnetooptical disks, and particularly resin compositions for resin films serving as a protective layer or adhesive layer in direct contact with a metal film.

PRIOR ART

Optical disks and magnetooptical disks have been used as media taking advantage of light to read or read/write memory data.

For example, optical disks used as compact disks are made by forming a metal film having pits on a transparent resin disk to archive some data by pit sequences, then forming a protective layer on the surface of the metal film, and are irradiated with laser beams from the side of the transparent resin disk in the direction of the metal film to read the reflected beams.

In such optical disks, characteristics of the protective layer significantly influence the lives of the optical disks because they end their lives when atmospheric moisture penetrating the resin film corrodes the metal film to hinder reading of data, therefore various materials have been studied.

For example, JPA No. 206926/88 discloses an optical disk of a structure comprising a metal film sandwiched between two transparent disks wherein a high-hardness resin is used for a protective layer or adhesive layer to obtain a protective layer with low moisture permeability and high moisture resistance.

JPA No. 287847/89 discloses a protective layer having a given tensile stress in view of stress corrosion of the metal film and describes that a medium with high weathering resistance is obtained.

Thus, many studies have been devoted to characteristics, materials or the like of the protective layer to prevent corrosion of the metal film. However, high-hardness resins lower moisture permeability, but increase cure shrinkage to strain the optical disk as a whole leading to stress corrosion. On the contrary, resins based on tensile stress are thermosetting type which is more likely to cause thermal stress than UV-curable resins.

JPA No. 101656/90 discloses a protective layer with cure shrinkage, moisture permeability, water absorption and moisture absorption within a given range to prevent oxidation of the metal film and provide a highly reliable medium. However, it is difficult to control all these conditions in terms of manufacturing processes.

In order to solve the problems of the prior art described above, the present invention aims to provide a resin suitable for use as a protective layer or adhesive layer formed on the surface of a metal film.

SUMMARY OF THE INVENTION

In the course of studies of the relation between corrosion of the metal thin film of optical recording media and the material of the resin film used for a protective layer or adhesive layer, we found that the specific gravity of liquid oligomers which give corrosion-inhibitive resin films is lower than the specific gravity of conventional liquid oligomers.

Resin films which expose metal films to less corrosion are generally believed to have low water permeability. However, high-specific gravity liquid oligomers which have many bulky substituents are believed to prevent penetration of moisture by the bulky substituents to provide a resin film with low water permeability when they are polymerized.

Corrosion tests on resin films prepared from resin compositions using liquid oligomers with various specific gravities revealed that high-specific gravity liquid oligomers having an average specific gravity of 1.10 or more provide corrosion-inhibitive resin films.

The present invention is based on the above findings. According to an aspect of the present invention, a resin composition containing a photocurable resin involved in photopolymerization reaction wherein the photocurable resin comprises a liquid oligomer having a specific gravity of 1.10 or more.

Here the liquid oligomer may be an epoxy acrylate.

Further the liquid oligomer may be contained in the photocurable resin within the range from 35% by weight to 78% by weight both inclusive based on 100 parts by weight of the photocurable resin.

Here the liquid oligomer may be an epoxy acrylate.

The resin compositions can be photopolymerized to form resin films serving as a protective layer or adhesive layer.

According to another aspect of the present invention, the invention relates to an optical recording medium comprising a substrate and a metal film formed on the substrate wherein data are readably recorded in the metal film and a resin film is formed on the metal film by applying a resin composition and curing it by photopolymerization, characterized in that the photocurable resin in the resin composition contains a liquid oligomer having a specific gravity of 1.10 or more.

Here the liquid oligomer may be an epoxy acrylate.

Further the liquid oligomer may be contained in the photocurable resin within the range from 35% by weight to 78% by weight both inclusive based on 100 parts by weight of photocurable resin.

Here the liquid oligomer may be an epoxy acrylate.

The resin compositions of the present invention can be used to form a resin film on a metal film. The resin film can serve as a protective layer or adhesive layer for the metal film to form an optical recording medium. Optical recording media of the present invention include those read with laser beams such as compact disks as well as magnetooptical disks using a combination of laser means and magnetic means.

Numeral references represent the following elements: 10, 20: optical recording medium; 11, 21: substrate; 12, 22: metal film; 13, 23: resin film.

DETAILED DESCRIPTION OF THE INVENTION

Some examples of the present invention will now be explained together with comparative examples.

Liquid oligomers A to D having high specific gravities of 1.13 or more or conventional liquid oligomers E and F having specific gravities of 1.04 and 1.08 were mixed with 30 parts by weight of a first monomer (tripropylene glycol diacrylate), 20 parts by weight of a second monomer (phenoxyethyl acrylate), 5 parts by weight of an initiator (Darocur 1173) and 5 parts by weight of other ingredients (inhibitor or the like) based on 50 parts by weight of each of liquid oligomers A to F to prepare four resin compositions 1 to 4 of the present invention and comparative resin compositions 5 and 6.

Figure 1A:
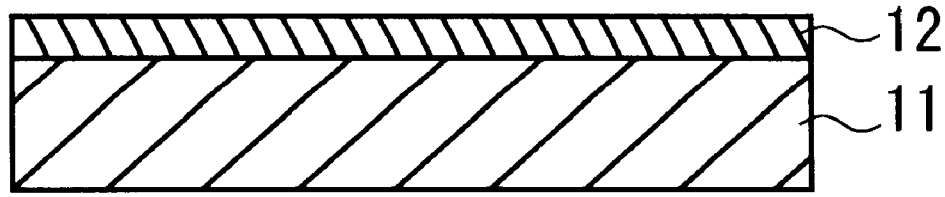
FIGS. 1a and 1b illustrate manufacturing steps of an example of optical recording media of the present invention.
Figure 1B:
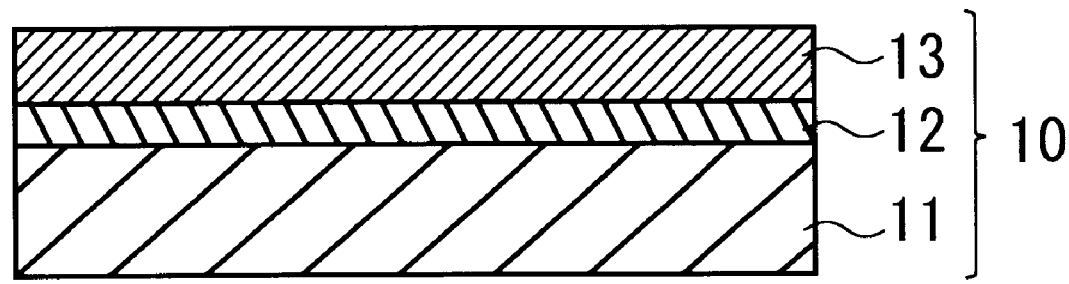
Figure 2:
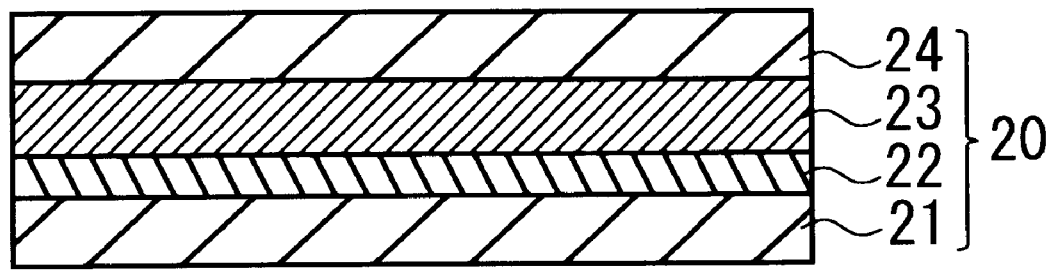
FIG. 2 illustrates another example of optical recording media of the present invention.

Separately, a substrate 11 (thickness 1.2 mm) formed of a transparent polycarbonate having an aluminium thin film 12 (film thickness 500 angstroms) on the surface was prepared by sputtering as shown in FIG. 1a, and each of resin compositions 1 to 6 was dropped on the surface of the aluminium thin film 12 to form a resin composition layer by spin coating, and then the layer was photocured under irradiation with UV rays (total dose 500 mJ/cm$^2$) to give a single-sided optical recording medium 10 having a resin film 13 on the surface of the aluminium thin film 12 as shown in FIG. 1b.

Alternatively, an aluminium thin film 22 was formed on a substrate 21 having a half of the thickness of the polycarbonate substrate 11 (thickness 0.6 mm), and each of resin compositions 1 to 6 was dropped on the surface of the aluminium thin film 22 to form a resin composition layer by spin coating, then a substrate 24 having the same thickness (0.6 mm) was adhered to the surface of the layer, and then the assembly was irradiated with UV rays to give a double-sided optical recording medium 20.

Six single-sided optical recording media 10 and six double-sided optical recording media 20 using resin compositions 1 to 6 were allowed to stand in an atmosphere at a temperature of 80° C. and a relative humidity of 85% for 1000 hours, and then the number of pinholes was counted.

Cure shrinkage (volume shrinkage) was determined from the specific gravity of each liquid and the specific gravity of the cured product.

Test results of resin compositions 1 to 6 are shown in the following table together with the gravity, grade and source of liquid oligomers A to F.

TABLE 1

Optical recording media using resin compositions 1–6

| | | Epoxy acrylate | Specific gravity | Disk durability Single-sided | Disk durability Double-sided | Cure shrinkage (%) | Epoxy grade | Source |
|---|---|---|---|---|---|---|---|---|
| Examples | Resin composition 1 | Liquid oligomer A | 1.15 | ○ | ○ | 6.5 | CN124 | Sartomer |
| | Resin composition 2 | Liquid oligomer B | 1.22 | ○ | ○ | 7.2 | EB601 | UCB |
| | Resin composition 3 | Liquid oligomer C | 1.13 | ○ | ○ | 6.2 | EB600 | UCB |
| | Resin composition 4 | Liquid oligomer D | 1.19 | ○ | ○ | 6.7 | EB3700 | UCB |
| Comparative examples | Resin composition 5 | Liquid oligomer E | 1.08 | Δ | X | 6.3 | CN115 | Sartomer |
| | Resin composition 6 | Liquid oligomer F | 1.04 | X | X | 6.5 | CN111 | Sartomer |

○: 10 or less pinholes
Δ: 11–20 pinholes
X: 21 or more pinholes

Optical recording media using four resin compositions 1 to 4 among resin compositions 1 to 6 are according to the present invention, while optical recording media using the other two resin compositions 5 to 6 are comparative examples. The above Table 1 shows that both of single-sided and double-sided optical recording media using resin compositions 1 to 4 caused no pinhole, proving that resin films with excellent protective characteristics have been formed.

In Table 1, epoxy grade is represented by the trade names commercialized by each source, wherein CN111 is a soybean-modified epoxy acrylate and the others are bisphenol A-type acrylates. Under the head of source, "Sartomer" and "UCB" are abbreviations of Sartomer Company and UCB Chemicals Corporation, respectively, both of which are overseas companies.

Then, different contents of the high-specific gravity liquid oligomer A and the first and second monomers were used to prepare two resin compositions 7 and 8 of the present invention. Similarly, different contents of the high-specific gravity liquid oligomer D and the first and second monomers were used to prepare resin compositions 9 and 10 of the present invention.

Resin compositions 7 to 10 were used to prepare single-sided optical recording media and double-sided optical recording media in the same manner as described for resin compositions 1 to 6 in Table 1.

These media were allowed to stand under the same conditions as above (80° C., 85%) for 1000 hours, and the number of pinholes was counted. The results are shown in the following Table 2.

TABLE 2

Optical recording media using resin composition 7–10

| Ingredients | | Resin composition 7 | Resin composition 8 | Resin composition 9 | Resin composition 10 |
|---|---|---|---|---|---|
| Liquid oligomer A | | 47 | 78 | | |
| Liquid oligomer D | | | | 55 | 35 |
| First monomer | | 23 | | 15 | 40 |
| Second monomer | | 30 | 22 | 30 | 25 |
| Initiator | | 5 | 5 | 5 | 5 |
| Disk durability | Single-sided | ○ | ○ | ○ | Δ |
| | Double-sided | ○ | ○ | ○ | Δ |

○: 10 or less pinholes
Δ: 11–20 pinholes
X: 21 or more pinholes
First monomer . . . tripropylen glycol diacrylate
Second monomer . . . phenoxyethyl acrylate
Initiator . . . Darocur 1173

The results in Table 2 show that resin compositions 7 to 10 of the present invention provide resin films with high protective characteristics as demonstrated by less pinholes. Resin composition 10 causes more pinholes than the other resin compositions 1 to 9 though it uses a high-specific gravity liquid oligomer D. This is attributed to the low content of liquid oligomer D. This test result of resin composition 10 proves that a high-specific gravity liquid oligomer should desirably be contained from 35% by weight to 78% by weight or more.

Advantages of the Invention

Resin compositions of the present invention can be used to form resin films with good protective characteristics, which provides long-life optical recording media.

What is claimed is:

1. An optical recording medium comprising a substrate and a metal film formed on said substrate wherein data are readably recorded in said metal film and a resin film is formed on said metal film by applying a resin composition and curing it by photopolymerization, characterized in that the photocurable resin in said resin composition contains a liquid oligomer having a specific gravity of 1.10 or more, and the liquid oligomer is contained in said photocurable resin within the range from 35% by weight or more.

2. An optical recording medium according to claim 1, characterized in that said liquid oligomer is an epoxy acrylate.

3. An optical recording medium according to claim 1, characterized in that said liquid oligomer is contained in said photocurable resin within the range from 35% by weight to 78% by weight both inclusive.

4. An optical recording medium according to claim 3, characterized in that said liquid oligomer is an epoxy acrylate.

5. An optical recording medium according to claim 1, characterized in that said metal film is an aluminum.

* * * * *